United States Patent
Vasseur

(10) Patent No.: US 9,407,542 B2
(45) Date of Patent: Aug. 2, 2016

(54) NETWORK ARCHITECTURE FOR MINIMALISTIC CONNECTED OBJECTS

(75) Inventor: Jean-Philippe Vasseur, Saint Martin d'Uriage (FR)

(73) Assignee: Cisco Technology, Inc., San Jose, CA (US)

(*) Notice: Subject to any disclaimer, the term of this patent is extended or adjusted under 35 U.S.C. 154(b) by 516 days.

(21) Appl. No.: 13/331,776

(22) Filed: Dec. 20, 2011

(65) Prior Publication Data

US 2013/0159486 A1    Jun. 20, 2013

(51) Int. Cl.
| | |
|---|---|
| G06F 15/16 | (2006.01) |
| H04L 12/717 | (2013.01) |
| H04W 40/24 | (2009.01) |
| H04L 12/715 | (2013.01) |
| H04L 12/26 | (2006.01) |

(Continued)

(52) U.S. Cl.
CPC .............. H04L 45/42 (2013.01); H04L 45/64 (2013.01); H04W 40/24 (2013.01); *H04L 41/00* (2013.01); *H04L 43/00* (2013.01); *H04L 47/782* (2013.01)

(58) Field of Classification Search
USPC ........................................................ 709/223
See application file for complete search history.

(56) References Cited

U.S. PATENT DOCUMENTS

| | | |
|---|---|---|
| 6,990,086 B1 | 1/2006 | Holur et al. |
| 2005/0008015 A1 | 1/2005 | Meda |
| 2005/0114541 A1 | 5/2005 | Ghetie et al. |

(Continued)

FOREIGN PATENT DOCUMENTS

| | | |
|---|---|---|
| EP | 2107733 A1 | 10/2009 |
| WO | WO-2008108984 A2 | 9/2008 |
| WO | WO-2011038359 | 3/2011 |

OTHER PUBLICATIONS

Finnie, et al., "Notification of Transmittal of the International Search Report and the Written Opinion of the International Searching Authority, or the Declaration", Patent Cooperation Treaty, International Appl. No. PCT/US2012/070927, mailed May 21, 2013, 12 pages, European Patent Office, Rijswijk, Netherlands.

(Continued)

*Primary Examiner* — Natisha Cox
(74) *Attorney, Agent, or Firm* — Parker Ibrahim & Berg LLC; James M. Behmke; Stephen D. LeBarron

(57) ABSTRACT

In one embodiment, a network architecture comprises minimalistic connected objects (MCOs), distributed intelligence agents (DIAs), and central intelligence controllers (CICs). MCOs have limited intelligence sufficient to perform their respective designated task, securely join computer networks, and provide nominal state information. The MCOs are not configured to perform complex application-specific data processing, or complex networking tasks, such as making QoS decisions, participating in CAC operations, providing TE services, executing sophisticated reliability protocols, or extrapolating network management information. DIAs are configured to provide a computer network edge for the MCOs, and are responsible for intelligent networking management and for performing complex application-specific data processing for the MCOs. CICs operate within the computer network and are in communication with the DIAs to perform complex tasks for overarching control of MCO/DIA operation, and are also configured to provide one or more interfaces to receive a set of user-defined rules for MCO/DIA operation.

21 Claims, 14 Drawing Sheets

(51) Int. Cl.
*H04L 12/24* (2006.01)
*H04L 12/911* (2013.01)

(56) References Cited

U.S. PATENT DOCUMENTS

| | | | |
|---|---|---|---|
| 2006/0022815 A1* | 2/2006 | Fischer et al. | 340/505 |
| 2006/0143439 A1* | 6/2006 | Arumugam | G06Q 10/08 713/153 |
| 2007/0057807 A1* | 3/2007 | Walters | G06Q 30/04 340/7.29 |
| 2008/0304485 A1 | 12/2008 | Sinha et al. | |
| 2009/0129271 A1 | 5/2009 | Ramankutty et al. | |
| 2010/0054241 A1 | 3/2010 | Shah et al. | |
| 2010/0248639 A1* | 9/2010 | Ryu | 455/67.11 |
| 2010/0332642 A1* | 12/2010 | Krishnaswamy | H04L 41/14 709/224 |
| 2011/0044207 A1* | 2/2011 | Meyers | H04Q 9/00 370/254 |
| 2011/0228750 A1* | 9/2011 | Tomici | H04W 8/082 370/338 |
| 2012/0084568 A1* | 4/2012 | Sarikaya | H04L 9/3252 713/176 |
| 2013/0014217 A1* | 1/2013 | Yadav et al. | 726/3 |
| 2013/0103795 A1* | 4/2013 | Kulkarni et al. | 709/217 |

OTHER PUBLICATIONS

Dimitrelis, et al., "Autoconfiguration of Routers Using a Link State Routing Protocol", draft-dimitri-zospf-00.txt, IETF Internet Draft, Oct. 2002, 17 pages.

Winter, et al., "RPL IPv6 Routing Protocol for Low Power and Lossy Networks", draft-ietf-roll-rpl-19, IETF Internet Draft, Mar. 2011, 164 pages.

* cited by examiner

NETWORK ARCHITECTURE FOR MINIMALISTIC CONNECTED OBJECTS

TECHNICAL FIELD

The present disclosure relates generally to computer networks.

BACKGROUND

Over the past few years, the notion of smart connected objects such as sensors and actuators opened the door to an endless number of applications such as smart grids, connected vehicles, smart cities, or smart healthcare, to mention a very few. To that end, several "architectures" have been proposed, generally consisting of either connecting these devices through multi-protocol gateways or using the Internet Protocol (IP) (e.g., IPv6) end-to-end, in addition to various mixed options.

So far, the typical strategy consisted of implementing sophisticated networking protocols on constrained devices, responsible of handling quality of service (QoS), routing, management, traffic engineering, sensing, algorithms for traffic reduction in the network, sophisticated strategies to increase channel capacity on low-bandwidth links, self-healing techniques for fast failure restoration in addition to con-strained-routing, call admission control (CAC) and back-pressure mechanisms, etc. In other words, the general consensus has been to make the "Internet of Things" (e.g., low-power and lossy networks or LLNs) as smart as possible, still while bounding the required resources at the edge of the IoT.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
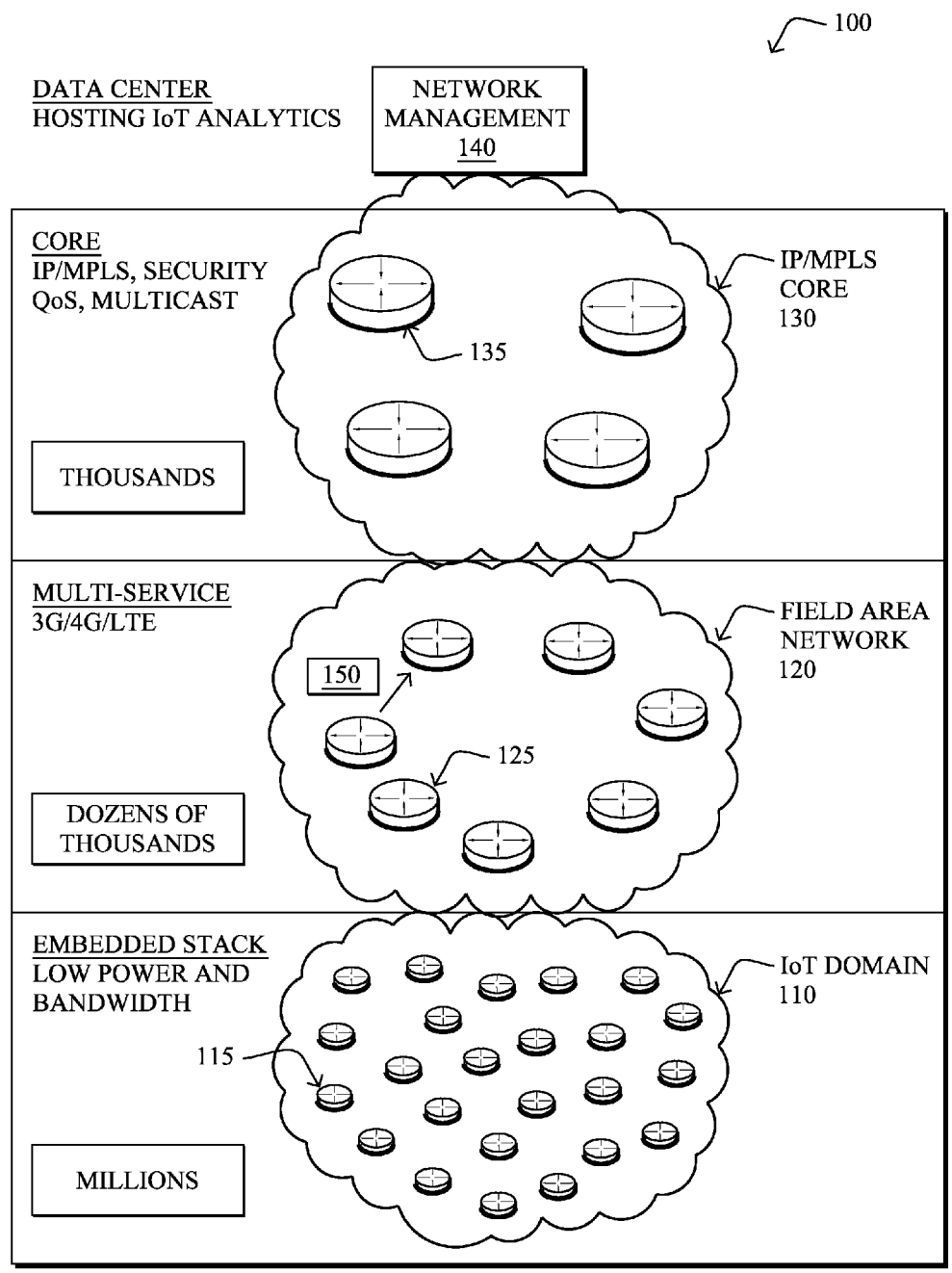
FIG. 1 illustrates an example computer network.

According to one or more embodiments of the disclosure, a network architecture comprises one or more minimalistic connected objects (MCOs), one or more distributed intelligence agents (DIAs), and one or more central intelligence controllers (CICs). Specifically, each MCO has limited intelligence sufficient to perform its respective designated task, securely join a computer network, and provide nominal state information, where the MCOs are not configured to perform complex application-specific data processing and complex networking tasks, such as making quality of service (QoS) decisions, participating in call admission control (CAC) operations, providing traffic engineering (TE) services, executing sophisticated reliability protocols, or extrapolating network management information. Also, the DIAs are configured to provide an edge to the computer network for the MCOs, and are responsible for intelligent networking management for the MCOs and for performing complex application-specific data processing for the MCOs. Lastly, the CICs operate within the computer network and are in communication with the DIAs to perform complex tasks for overarching control of MCO and DIA operation, and are also configured to provide one or more interfaces to receive a set of user-defined rules for the MCO and DIA operation.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example computer network 100 illustratively comprising nodes/devices interconnected by various methods of communication. For instance, the links (not shown) may be wired links or shared media (e.g., wireless links, PLC links, etc.) where certain nodes, such as, e.g., routers, sensors, computers, etc., may be in communication with other nodes, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

According to the illustrative network 100, a plurality of network "hierarchies" may be created, where each hierarchy may, though need not, consist of a generally disparate type of device and/or communication protocol. As shown, an IoT domain 110 (also referred to as an LLN 110) may consist of an embedded stack of "objects" 115, such as sensors, actuators, etc., as described above, interconnected by generally low-power and/or lossy links. Illustratively, the IoT domain may conceivably consist of millions of objects 115.

Each IoT domain 110 (only one shown for clarity) may be interconnected to a next hierarchical level, such as a field area network 120, which illustratively provides the edge of the "cloud" or core network 130. The field area network(s) 120 may interconnect one or more IoT domains to the core network 130, and generally comprises a plurality of routers 125 (or switches or gateways). In an example embodiment, communication at the field area networks may comprise multi-service protocols, such as "3G," "4G," "LTE," etc., as will be clearly understood in the art. Typically, the number of devices 125 within a field area network could reach dozens of thousands.

Ultimately, as noted, the field area networks 120 (one shown for clarity) are interconnected by a core network 130, such as an Internet Protocol (IP) network and/or Multi-Protocol Label Switching (MPLS) network of generally more-capable devices 135 (e.g., thousands of them), such as core routers, switches, etc. Generally, this hierarchical level controls the security, quality of service (QoS), multicast operation, etc. of the IoT domain in addition to supporting these features within the Field Area Network itself. A network management component 140 may exist within the core network 130, or else may be interconnected via the core network 130, to provide various high-level functionality, such as hosting of IoT analytics, network management services (NMS), etc. For example, the network management component 140 may consist of one or more servers configured to provide high-level control over the network operations of network 100, and may provide an interface to users (administrators), as described herein.

Data packets 150 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. As mentioned, each hierarchy may, though need not, utilize a different protocol than each other, and may, in fact, utilize a different protocol than other sub-domains within a hierarchy (e.g., different IoT domains 110 or field area networks 120).

Figure 2A:
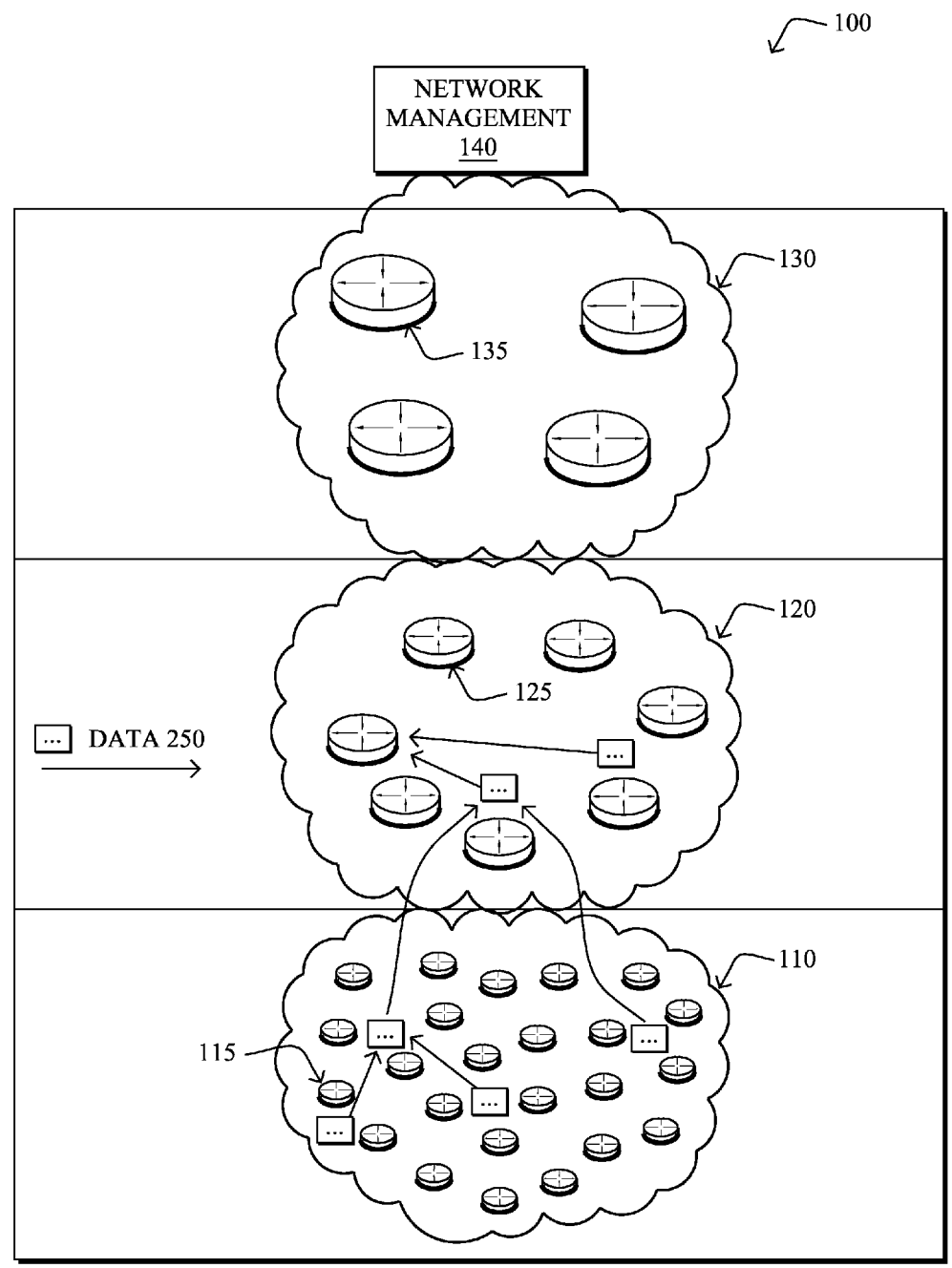
FIGS. 2A-2E illustrate examples of data flow within the computer network of FIG. 1.
Figure 2B:
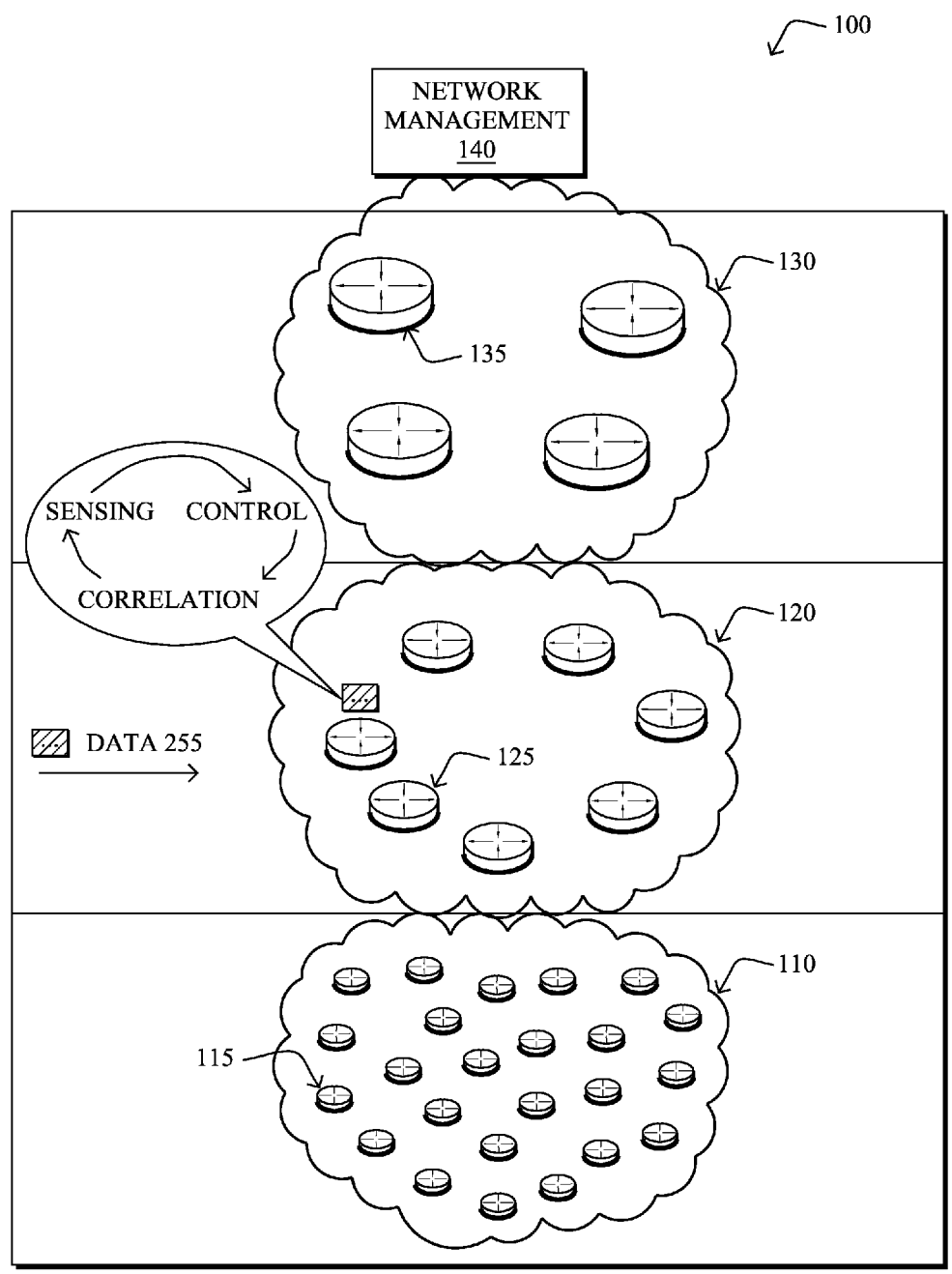
Figure 2C:
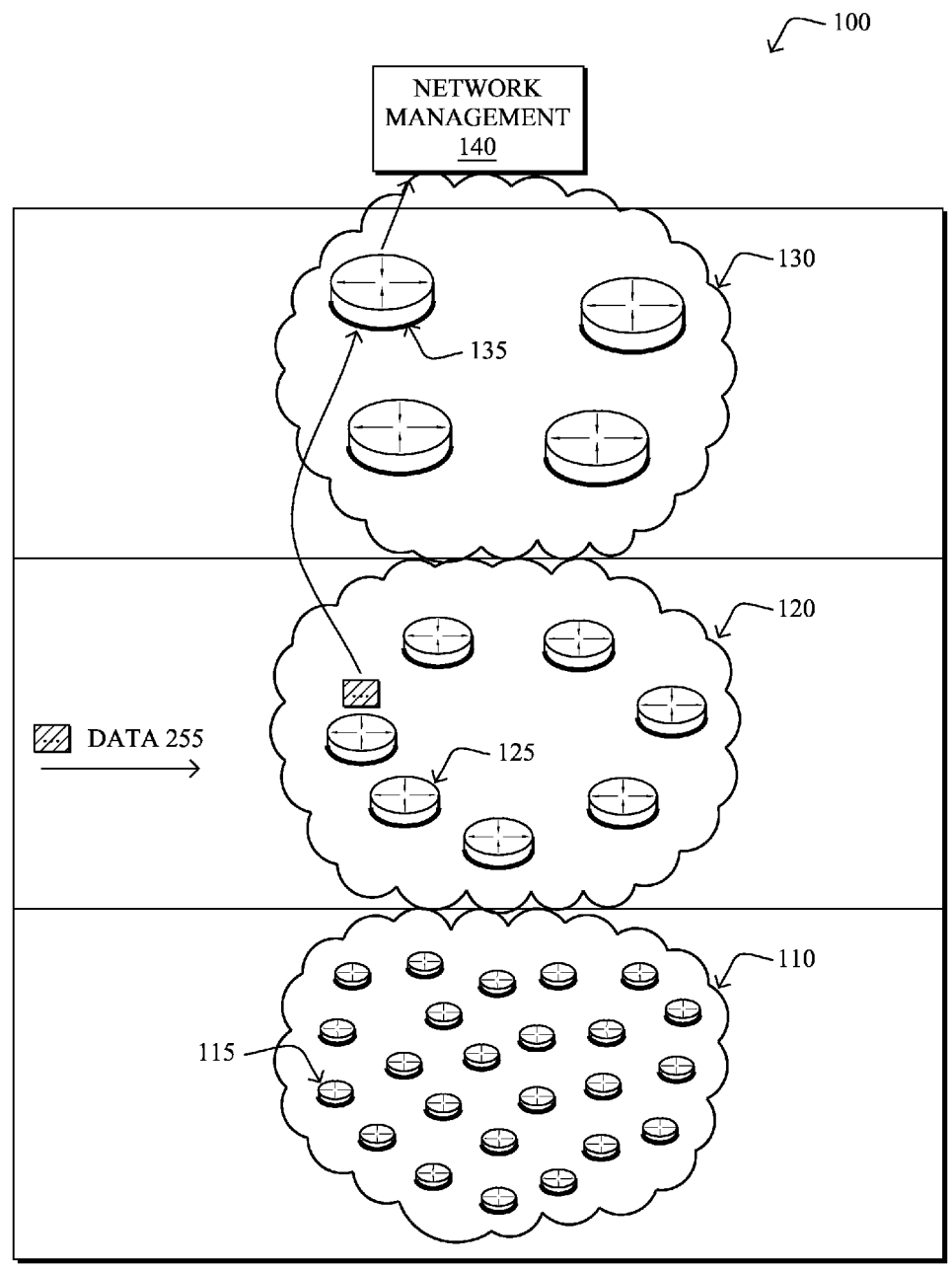
Figure 2D:
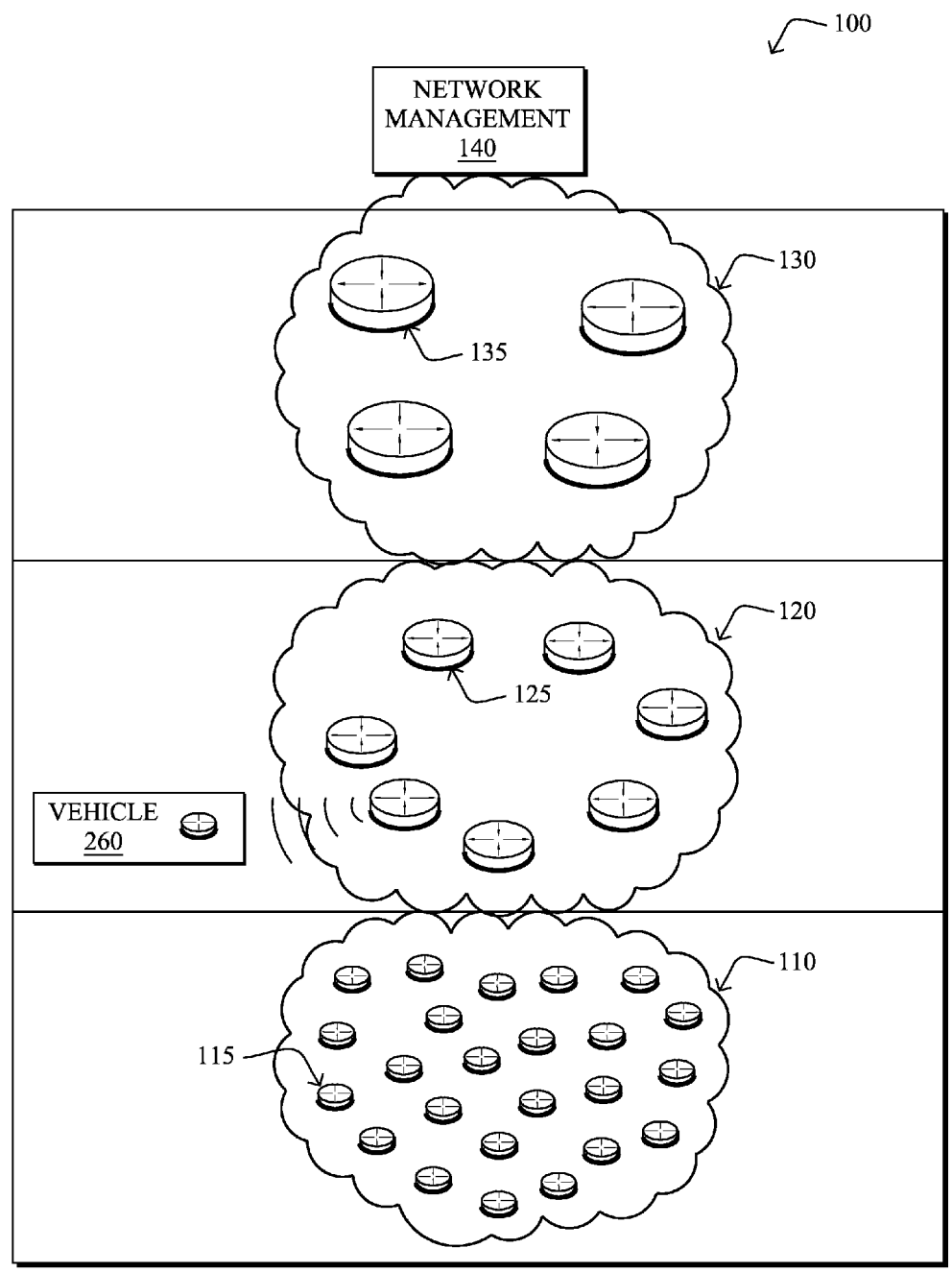
Figure 2E:
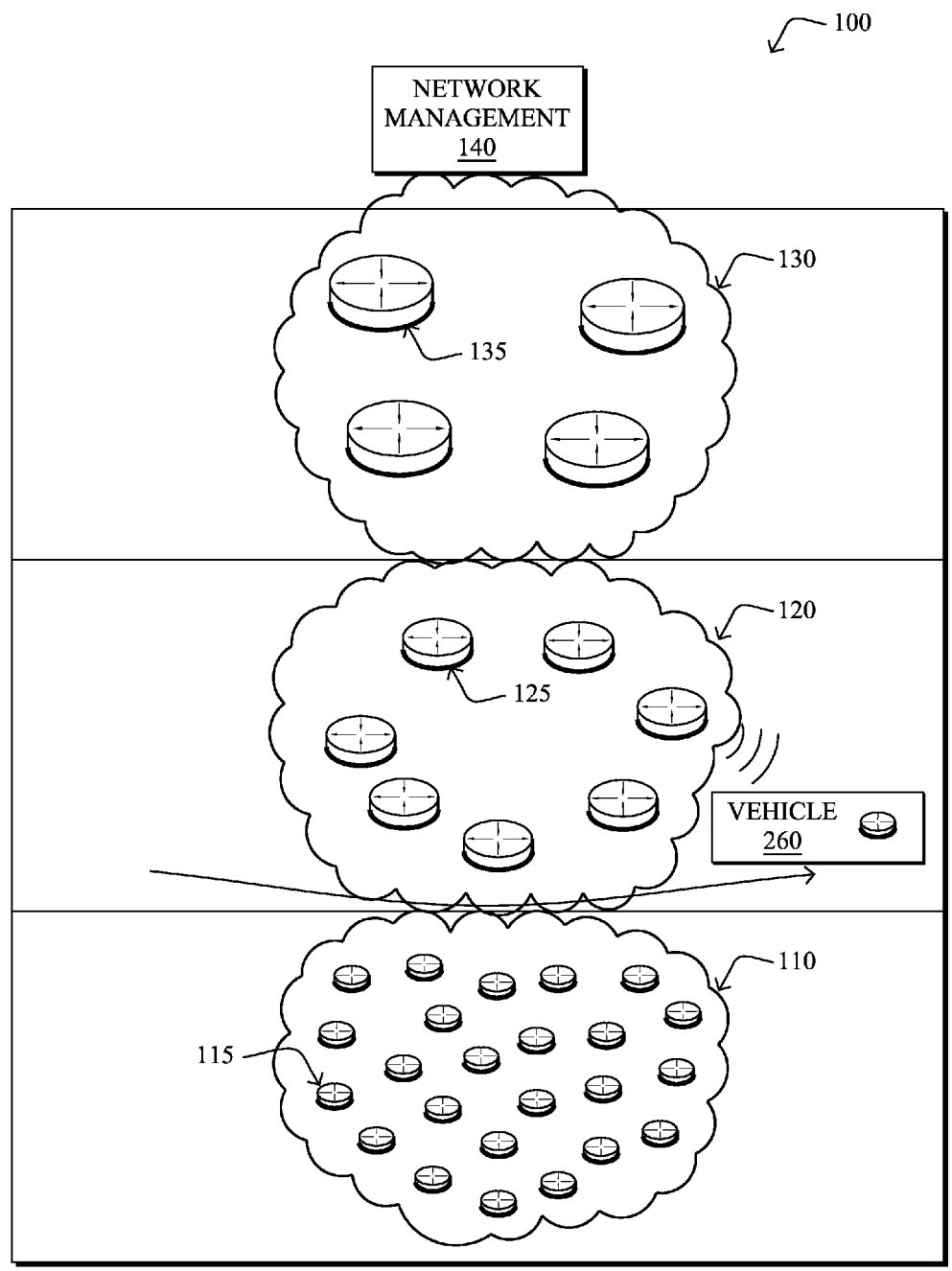

FIGS. 2A-2E illustrate example data flows within the computer network 100 of FIG. 1, such as in accordance with general IoT operation, and as may be used in accordance with the techniques described herein. For example, as shown in FIG. 2A, data 250 may be collected by various objects 115, and transmitted (e.g., as a packet 150) along the way to one or more field area network devices 125, and may be subjected to various degrees of aggregation, dropping, etc. along the way. The field area network devices 125 may then, as shown in FIG. 2B, apply further intelligence to the data 250, such as sensor applications, control, and correlation, and the processed data 255 may then be transmitted to the network management devices 140 as shown in FIG. 2C. Moreover, as a specific example of IoT operation to illustrate mobile objects, FIGS. 2D and 2E illustrate how an object 115, such as a vehicle 260 (generally, as a vehicle may actually comprise many network connected "objects"), may travel between IoT domains 110, and may be transferred between field area network devices 125 (such as field area routers or "FARs") or even field area networks 120 in general, depending upon proximity.

As noted above, over the past few years, the notion of smart connected objects such as sensors and actuators has opened the door to an endless number of applications such as smart grids, connected vehicles, smart cities, or smart healthcare to mention a very few. To that end, several "architectures" have been proposed, consisting of either connecting these devices through multi-protocol gateways or using IP (v6) end-to-end, in addition to various mixed options.

The idea of using multi-protocol gateways causes problems for a number of reasons, though are beneficial for protocol migration and limited in-time strategies offering a migration path from existing legacy protocols to IP. Some of the problems include operational complexity, lack of scalability (exponential number of protocol conversions), lack of QoS and routing consistency, single point of failure (the use of statefull multi-protocol gateways being a very costly option), security holes, etc.

Accordingly, a clear momentum in favor of IP end-to-end has emerged and a number of technologies have been developed and specified since 2007:

Lightweight operating systems running on low-power micro-controllers equipped with a few Kbytes of RAM and Flash and 8/16-bit micro-controllers; and Optimized IPv6 stacks and the emergence of new low-power PHY/MAC technologies (e.g., IEEE 802.15.4, low-power Wifi, P1901.2, PRIME, HP GreenPHY, etc.).

After careful analysis of the IP protocol suite, it was recognized that new IP protocols were required for these highly constrained and harsh environments. Some key examples include:

1) 6LoWPAN: an adaptation layer handling fragmentation for low MTU links in addition to header compression;
2) RPL: a new routing protocol for LLNs;
3) CoAP: a lightweight resource management protocol designed to run on low-power end devices, significantly lighter than SNMP; and
4) Various optimization functions hosted at the link layer (e.g., frequency hopping for 15.4 g, PLC (P1901.2), etc.).

So far, the typical strategy consisted of implementing sophisticated networking protocols on constrained devices, responsible of handling QoS, routing, management, traffic engineering, sensing, algorithms for traffic reduction in the LLN, sophisticated strategies to increase channel capacity on low-bandwidth links, self-healing techniques for fast failure restoration in addition to constrained-routing, call admission control (CAC) and back-pressure mechanisms, etc. In other words, the goal has been to make the Internet of Things (IoT) as smart as possible, still while bounding the required resources at the edge the IoT (LLN).

Figure 3:
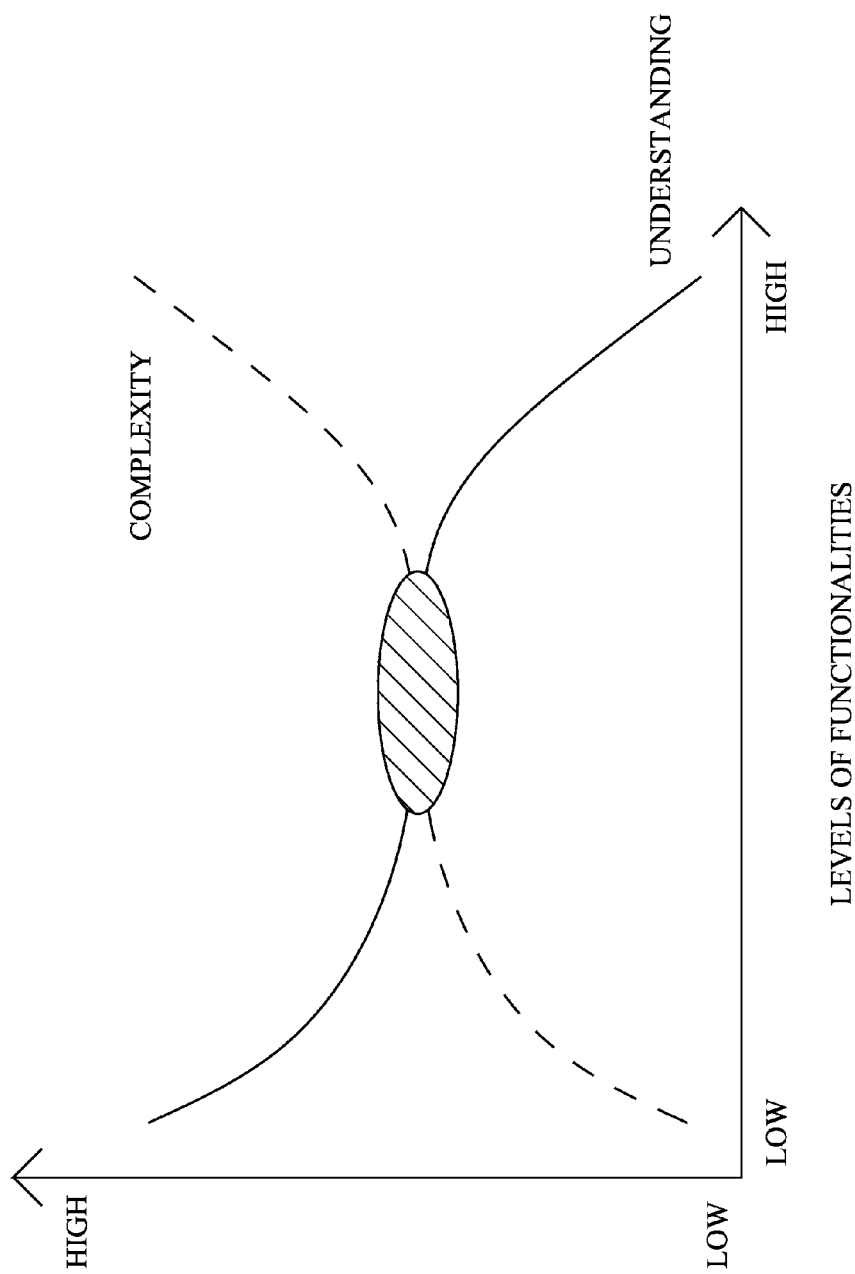
FIG. 3 illustrates an example trade-off between functionality and scalability in complex systems.

There is, however, a delicate trade-off between functionality and scalability in complex systems. That is, in many areas, one can obverse the phenomena shown in FIG. 3. As functionalities are added to devices, the complexity of the overall system combining all features (also simply referred to as "the network") increases to a point where incremental cost is acceptable before hitting an inflection point, at which time the overall understanding and scalability of that system drops dramatically. Although it is quite challenging to model mathematically such models with stochastic Petri networks or Markov chains, such an empirical analysis is mostly driven by years of experience designing and operating complex systems. Note that although scalability is a multi-polynomial function varying according to a number of factors, the weight of the "understanding" factor is undoubtedly large; in many circumstances, technologies have not been adopted in the field, not because they were intrinsically non-scalable from a technological standpoint but because understanding the overall system was too costly in light of the added value for the end-user. For example, from a purely technological standpoint, even though certain systems can be understood, as the level of functionality increases the number of pathological non-understood cases also grows extremely rapidly.

After a few years of deep technical investigations, the overall complexity to be supported by smart objects does not grow linearly with the size of these networks and the number of supported features, but rather it grows exponentially, causing the scalability of the overall system itself to collapse. In the case of the IoT, we can expect an amplification of this phenomena for two reasons: (1) The scale of such network largely exceeds the largest known networks so far with potentially millions of devices; and (2) unexpectedly, the design of lightweight protocols (with a small footprint in terms of memory and bandwidth usage) requires quite sophisticated techniques with unknown behavioral patterns leading to added complexity in this part of the network, also known as the LLN (Low-power and Lossy Networks) or IP Smart Object Networks.

An objective of the new network architecture described herein is to rethink the current model consisting of adding distributed intelligence of end devices and instead to limit the intelligence to the minimum required to provide secured connectivity. As described below, intermediate agents hosted on edge devices of the Field Area Network (e.g. routers) referred herein to as edge routers are introduced that assist these end devices in a number of decision making processes (QoS, network management, traffic engineering, etc.) and closely interact with central intelligence (hosted or more capable computers, e.g., in a data center) in order to make appropriate decisions, for instance, thanks to learning machines fed by traffic observation (e.g., deep packet inspection), a set of objectives (e.g., Service Level Agreements or SLAs), performance monitoring, analysis of behavioral patterns and network dynamics (e.g., to trade-off between optimality and stability), etc.

In particular, the techniques herein address switching intelligence and network control to the router edge boundary. As pointed out above, it is worth thinking of a radically new networking model for the Internet of Things (IoT), leading to a radical shift in terms of networking in a number of areas such as routing, self-healing techniques, QoS, CAC, NMS, reliability or security. According to the embodiments described below, the techniques herein generally consist of moving the networking intelligence at the second-tier of the network, on routers located at the fringe of the LLN (sometimes referred to as LBRs: LLN Border Routers) where resources can be considered as "non-limited" by contrast with devices (sensors/actuators/tags) in the LLNs. The main principle lies into the ability for the LBR and other components (applications running on routers, out-of-band routers/servers, etc.) to host functions where the output of which is then provided to Minimalistic Connected Objects or "MCOs" (which may also be referred to as "dumb connected objects or "DCOs" as contrasted to "smart objects").

In this new architectural model, sensors/actuators purposefully become IPv6 "minimalistic connected objects" as opposed to smart objects (the trend the whole industry has been promoting for the last decade).

As rationale, one primary technological reason lies in the ability to scale networks to a size an order of magnitude larger than the current Internet. Simple math shows that extremely large-scale LLNs imply very advanced technologies (not previously specified and/or known) in order to effectively manage these networks. It thus becomes important to note that such networks are to be autonomic, self-configured, and embedded with local intelligence to support self-healing technologies and auto-configuration, and capable of performing local troubleshooting. Breaking large domains into smaller ones helps to reduce the overall complexity, but only as a temporary measure.

By adopting a radically different strategy consisting of making these devices "merely connected" as opposed to "smart," the architecture described herein will enable a large eco-system, enable connectivity on extremely constrained devices (including energy scavenger enabled devices), and the network will be "fed" with valuable data, thus increasing the rationale for the network to host in-bound intelligence, making it the platform of the future.

In particular, this disclosure specifies a radically different architecture for the Internet of Things (IoT)/LLNs whereby smart objects are replaced by Minimalistic Connected Objects (MCOs) limited to providing basic secure connectivity to an LBR, at the fringe of "classic IP networks" connecting LLNs. LBRs illustratively host Distributed Intelligence Agents (DIAs), which are software/hardware modules fed by a number of inputs such as, e.g., traffic flow observation using deep packet inspection, SLA requirements specified by the user and provided by a Central Intelligence Controller (CIC). DIAs may also host a learning machine observing the flows and also the network dynamics and behavior trends, such that the DIA may further perform a number of tasks interacting with MCOs to activate when/where/if the required networking features such as network management, routing, quality of service (QoS), call admission control (CAC), etc. in the network.

Figure 4:
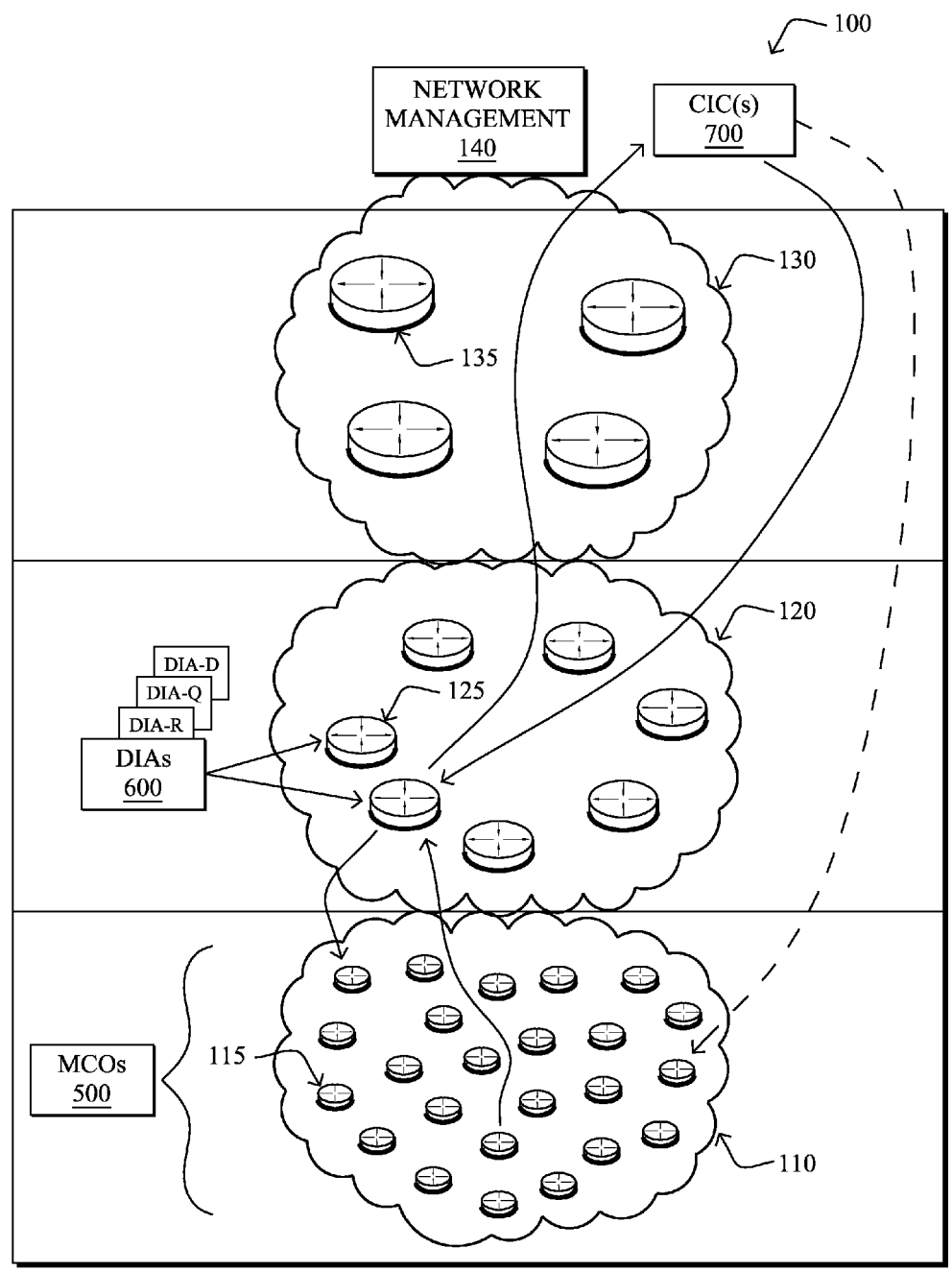
FIG. 4 illustrates an example view of the computer network in accordance with the architecture described herein for minimalistic connected objects (MCOs)

That is, according to one or more embodiments of the disclosure as described in detail below, a network architecture, as shown in FIG. 4, comprises one or more minimalistic connected objects (MCOs) 500, one or more distributed intelligence agents (DIAs) 600, and one or more central intelligence controllers (CICs) 700. Specifically, each MCO has limited intelligence sufficient to perform its respective designated task, securely join a computer network, and provide nominal state information, where the MCOs are not configured to perform complex application-specific data processing and complex networking tasks, such as making quality of service (QoS) decisions, participating in call admission control (CAC) operations, providing traffic engineering (TE) services, executing sophisticated reliability protocols, or extrapolating network management information, which contrasts with current IoT architectures. Also, the DIAs are configured to provide an edge to the computer network for the MCOs, and are responsible for intelligent networking management for the MCOs and for performing complex application-specific data processing for the MCOs. Lastly, the CICs operate within the computer network and are in communication with the DIAs to perform complex tasks for overarching control of MCO and DIA operation, and are also configured to provide one or more interfaces to receive a set of user-defined rules for the MCO and DIA operation.

Illustratively, the techniques described herein may be performed by hardware, software, and/or firmware, such as in accordance with respective processes specific to each type of device (MCO, DIA, CIC), which may contain computer executable instructions executed by a processor to perform functions relating to the novel techniques described herein, e.g., in conjunction with other processes executing on the respective devices. For example, the techniques herein may be treated as extensions to conventional protocols, such as various routing, communication, and/or management protocols, and as such, may be processed by similar components understood in the art that execute those types of protocols, accordingly.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while certain processes may be shown separately, those skilled in the art will appreciate that processes may be routines or modules within other processes.

Operationally, as noted above, a Minimalistic Connected Object (MCO) 500 is an object (e.g., sensor, actuator, radio frequency identifier (RFID) tag, or simple degenerated router) with an extremely lightweight processing requirement due to low intelligence and decision-making. By contrast with the current "Smart Objects" approach, an MCO has just enough intelligence to join a network using a degenerated routing approach, in a secure fashion, and provides just enough state information to the DIA/CIC (described below) with regards to its functionalities, resources, and supported capability. The MCOs generally perform no (self-directed) QoS or any form of CAC, TE, sophisticated reliability features, network management information (e.g., network statistics), and no application-specific data processing, since these functions are now hosted on the DIA 600, as described below.

Figure 5:
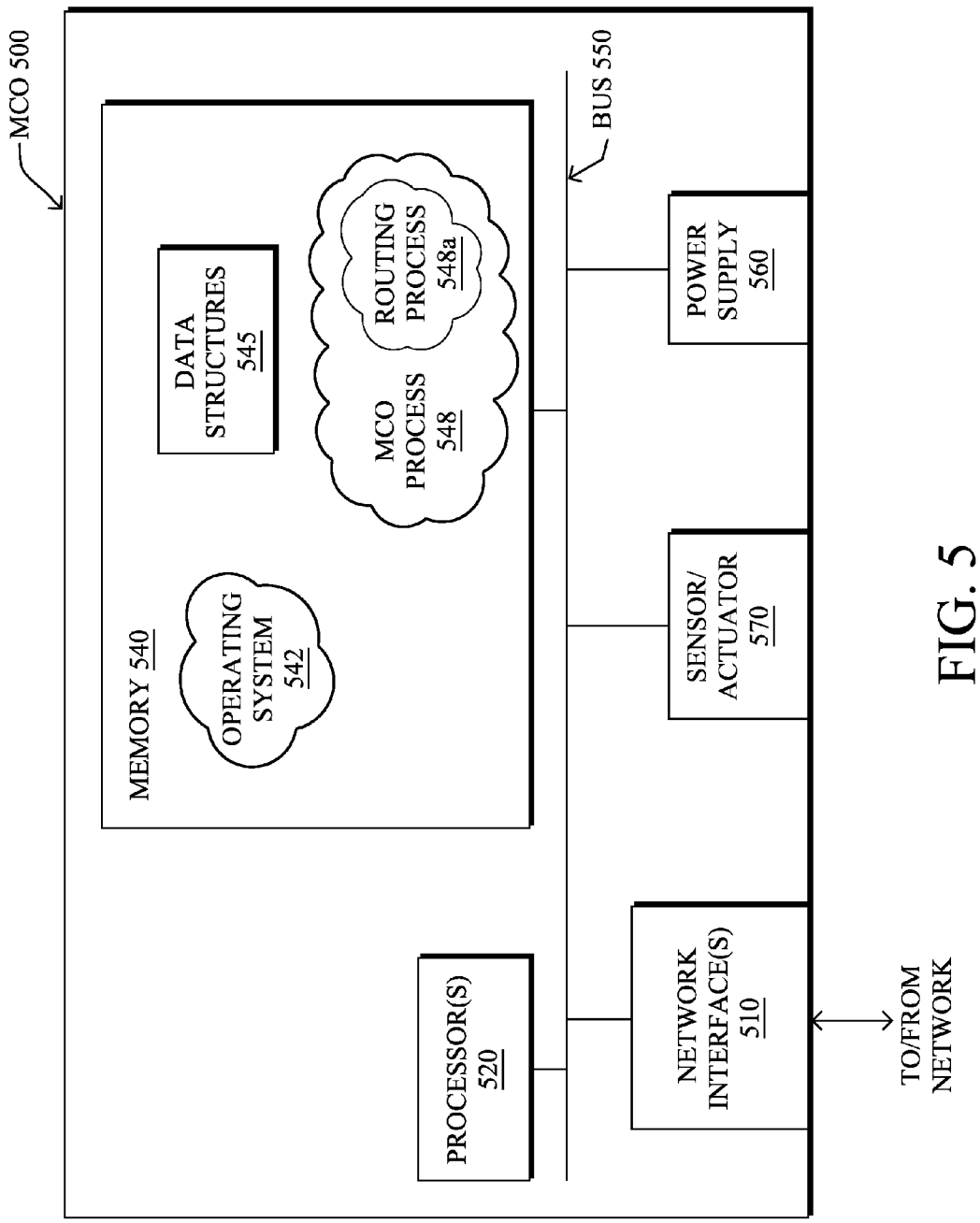
FIG. 5 illustrates an example of an MCO device.

FIG. 5 is a schematic block diagram of an example device 500 that may be used with one or more embodiments described herein as an MCO. The device may comprise one or more network interfaces 510 (e.g., wired, wireless, PLC, etc.), a processor 520, and a memory 540 interconnected by a system bus 550, as well as a power supply 560 (e.g., battery, plug-in, etc.). In addition, an MCO may generally comprise a sensor and/or actuator component 570.

The network interface(s) 510 contain the mechanical, electrical, and signaling circuitry for communicating data over links coupled to the network 100, i.e., in IoT domain 110. The network interfaces may be configured to transmit and/or receive data using a variety of different communication protocols. Note, further, that the nodes may have two different types of network connections 510, e.g., wireless and wired/physical connections, and that the view herein is merely for illustration. Also, while the network interface 510 is shown separately from power supply 560, for PLC the network interface 510 may communicate through the power supply 560, or may be an integral component of the power supply. In some specific configurations the PLC signal may be coupled to the power line feeding into the power supply.

The memory 540 comprises a plurality of storage locations that are addressable by the processor 520 and the network interfaces 510 for storing software programs and data structures associated with the embodiments described herein. Note that certain devices may have limited memory or no memory (e.g., no memory for storage other than for programs/processes operating on the device and associated caches). The processor 520 may comprise necessary elements or logic adapted to execute the software programs and manipulate the data structures 545. An operating system 542, portions of which are typically resident in memory 540 and executed by the processor, functionally organizes the device by, inter alia, invoking operations in support of software processes and/or services executing on the device. These software processes and/or services may illustratively comprise an "MCO process" 548, which may comprise one or more sub-processes, such as routing process/services 548*a*, as described herein.

As noted above, each MCO 500 has limited intelligence sufficient to perform its respective designated task (e.g., sense, actuate, route), securely join a computer network, and provide nominal state information. As such, MCO process 548 thus contains computer executable instructions executed by the processor 520 to perform functions related to such MCO actions, accordingly. As described herein, therefore, MCO process is not configured to perform complex application-specific data processing, make QoS decisions, participate in CAC operations, provide TE services, execute sophisticated reliability protocols, or extrapolate network management information. Routing process 548a is a generally degenerated routing process, and is kept simple enough to provide communication from the MCO 500 to other devices (other MCOs 500 or DIAs 600), accordingly. For example, topology information may be simply received from the DIAs as mentioned below, or else where MCOs are completely incapable of storing routing entries, routing process 548 may consist solely of providing mechanisms necessary for source routing techniques. That is, for source routing, other devices in the network can tell the less capable devices exactly where to send the packets, and the less capable devices simply forward the packets as directed. Alternatively, a minimalistic version of a routing protocol may be used, such as various simplified link-state protocols, e.g., a zeroconfiguration Open Shortest Path First or "zOSPF" as specified in an Internet Engineering Task Force (IETF) Internet Draft entitled "Autoconfiguration of routers using a link state routing protocol" <draft-dimitri-zospf-00> by Dimitrelis, at al. (October 2002 version), or else a simplified version of RPL, the full version of which is specified in the IETF Internet Draft entitled "RPL: IPv6 Routing Protocol for Low Power and Lossy Networks"<draft-ietf-roll-rpl-19>by Winter, et al. (Mar. 13, 2011 version).

According to the novel architecture described herein, another type of device, the Distributed Intelligence Agent (DIA) 600, consists of set of software/hardware modules hosted at the edge of the network (field area network 120), and are responsible for a number of networking and application oriented functionalities such as routing within the IoT/LLN 110, decisions on whether/if/how to dynamically activate QoS, CAC, Traffic Engineering, NMS-related processing (e.g., aggregation of networking statistics), application aware data processing (e.g., hosting an application that could interpret the data from the MCOs 500, potentially aggregate/drop data packets, trigger local actuation, etc.). The DIA 600 is hosted typically on a more capable device (e.g., an edge router) equipped with Deep packet Inspection, Internet Protocol flow information export (IPFIX) operational capability, etc., as may be appreciated by those skilled in the art.

Figure 6:
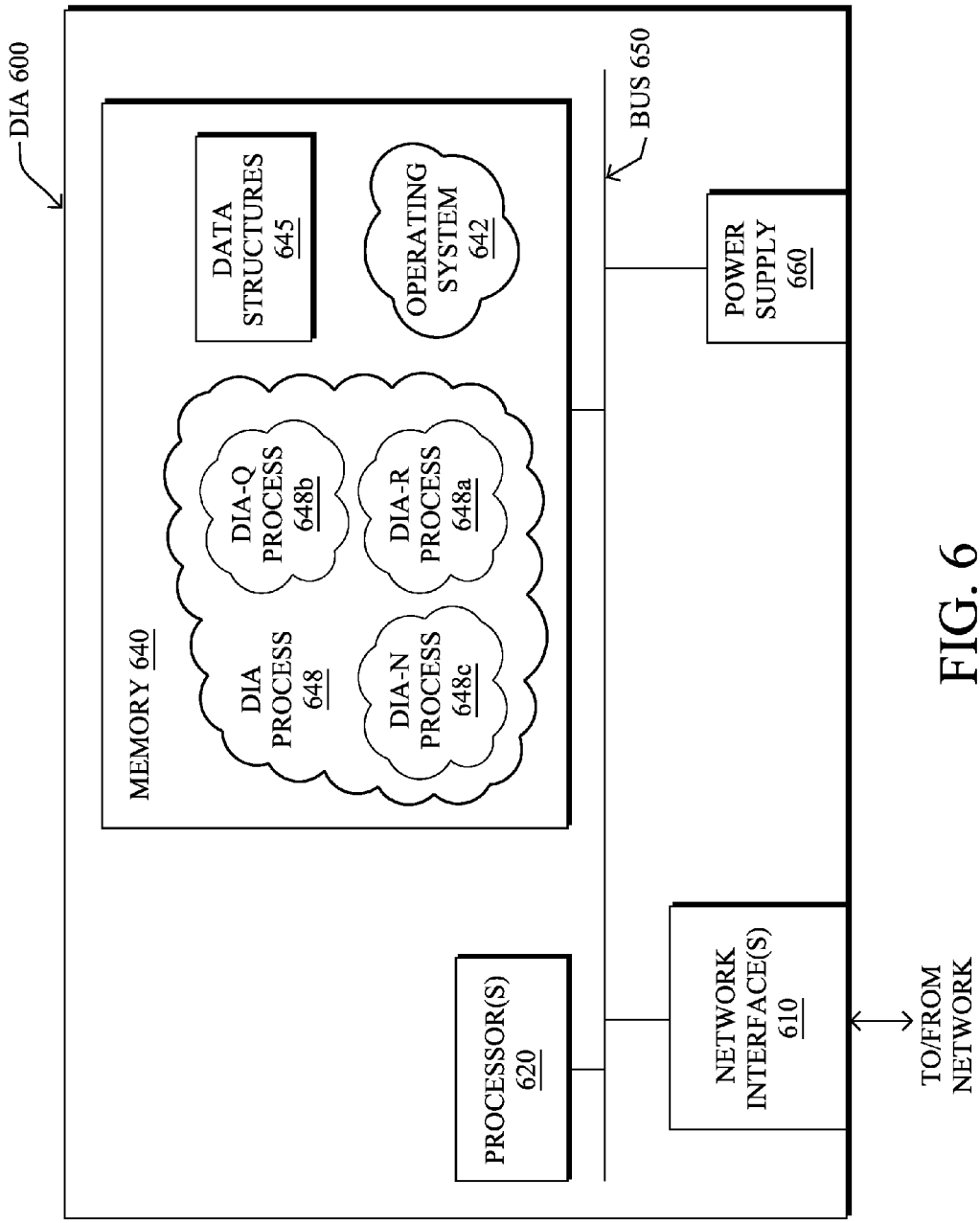
FIG. 6 illustrates an example of a distributed intelligence agent (DIA) device.

FIG. 6 is a schematic block diagram of an example device 600 that may be used with one or more embodiments described herein as a DIA. Similar to device 500, the DIA device 600 may comprise one or more network interfaces 610, at least one processor 620, and a memory 640 interconnected by a system bus 650, as well as a power supply 660 (e.g., plug-in). Generally, DIA device 600 is more capable than the limited MCO devices 500, and as such, may have greater processing capability, greater memory, etc.

Within the memory 640, an operating system 642 functionally organizes the device by, inter alia, invoking operations in support of software processes and/or services executing on the device, such as a "DIA process" 648, which may comprise one or more sub-processes, such as "DIA-R" process 648a, "DIA-Q" process 648b, "DIA-N" process 648c, etc., as described herein. That is, DIAs may be made of a set of intelligence modules each responsible for specific tasks: DIA-N (NMS) 648c, DIA-Q (QoS) 64ab, DIA-R (Routing) 648a, etc., in addition to application-related features (not related to the networking intelligence itself). Further, memory 640 may also be used to store one or more data structures 645, accordingly.

As noted above, each DIA 600 is configured to provide an edge to the computer network for the MCOs, and is responsible for intelligent networking management for the MCOs and for performing complex application-specific data processing for the MCOs. As such, DIA process 648 contains computer executable instructions executed by the processor 620 to perform functions related to such DIA actions, accordingly. As described herein, therefore, DIA process 648 is configured to perform complex application-specific data processing, such as interpreting data from the MCOs, aggregating data from the MCOs, dropping data from the MCOs, and triggering local actuation at the MCOs, as mentioned above. In addition, the DIA process 248 is further responsible for making QoS decisions (DIA-Q process 648b) for the MCOs, participating in CAC operations for the MCOs, providing TE services for the MCOs, and extrapolating network management information (DIA-N process 648c) for the MCOs, etc. Routing process (DIA-R) 648a contains computer executable instructions executed by the processor 620 to perform functions provided by one or more routing protocols, such as proactive or reactive routing protocols as will be understood by those skilled in the art. These functions may, on capable devices, be configured to manage a routing/forwarding table (a data structure 645) containing, e.g., data used to make routing/forwarding decisions.

Notably, DIAs 600 heavily rely on state reports provided by MCOs, traffic observation using deep packet inspections and IPFIX, but also closely interact with the CIC(s) 700 in order to determine the service level agreement and/or performance monitoring so as to determine whether network performances are aligned with the objectives (e.g., where performance results reports are provided by the DIA-N). In order to accomplish this, the various DIA processes 248 (modules 248a-c . . . ) may interact with each other: for example DIA-R (routing) may interact with the DIA-Q (QoS) so as to determine the consequences of a routing topology change on Quality of Service. Note that such collaboration is now possible, which is not the case with the current fully distributed models. That is, DIA 600 in general are intelligent modules in charge of performing tasks of various nature such as computing routing topologies, determining when/where/whether activating QoS in the network, performing local tasks related to NMS (instead of adopting a peer-to-peer network management function between the NMS and devices as in today's models), determining how to perform traffic engineering, etc. (Notably, the specifics of these features/algorithms and related protocols may be specified in detail elsewhere, and such specifics lie outside the scope of the present disclosure.)

Output decisions from the DIAs 600 result in sending messages (e.g., unicast or more rarely multicast messages) to MCOs 500 requesting behavioral changes, such as changes to forwarding decisions, activation of a QoS feature such as marking packets or applying priority to packets, activation and/or management of data generation (e.g., starting, stopping, and/or timing the sending of sensed data, such as if the sensed data has been determined as incorrect or non-coherent, or redundant, or unchanging, etc.). In addition, DIAs 600 may request the CIC(s) 700 to perform certain corrective actions, and CIC(s) may interact directly with an MCO 500, for example, in an attempt to download a new software/firmware upgrade on a dysfunctional device.

According to the novel architecture described herein, the final defined type of device, the Central Intelligence Controller (CIC) 700, is used to host more complex tasks for controlling the IoT domain 110, but also for receiving a set of rules defined by an end-user (e.g., specification of service level agreements (SLAs), levels of security, tasks for performance monitoring, etc.). The CIC(s) will have direct communication with the DIAs 600 that would make decisions and in turn communicate with MCOs, though in some cases the CIC may directly interact with MCOs 500.

Figure 7:
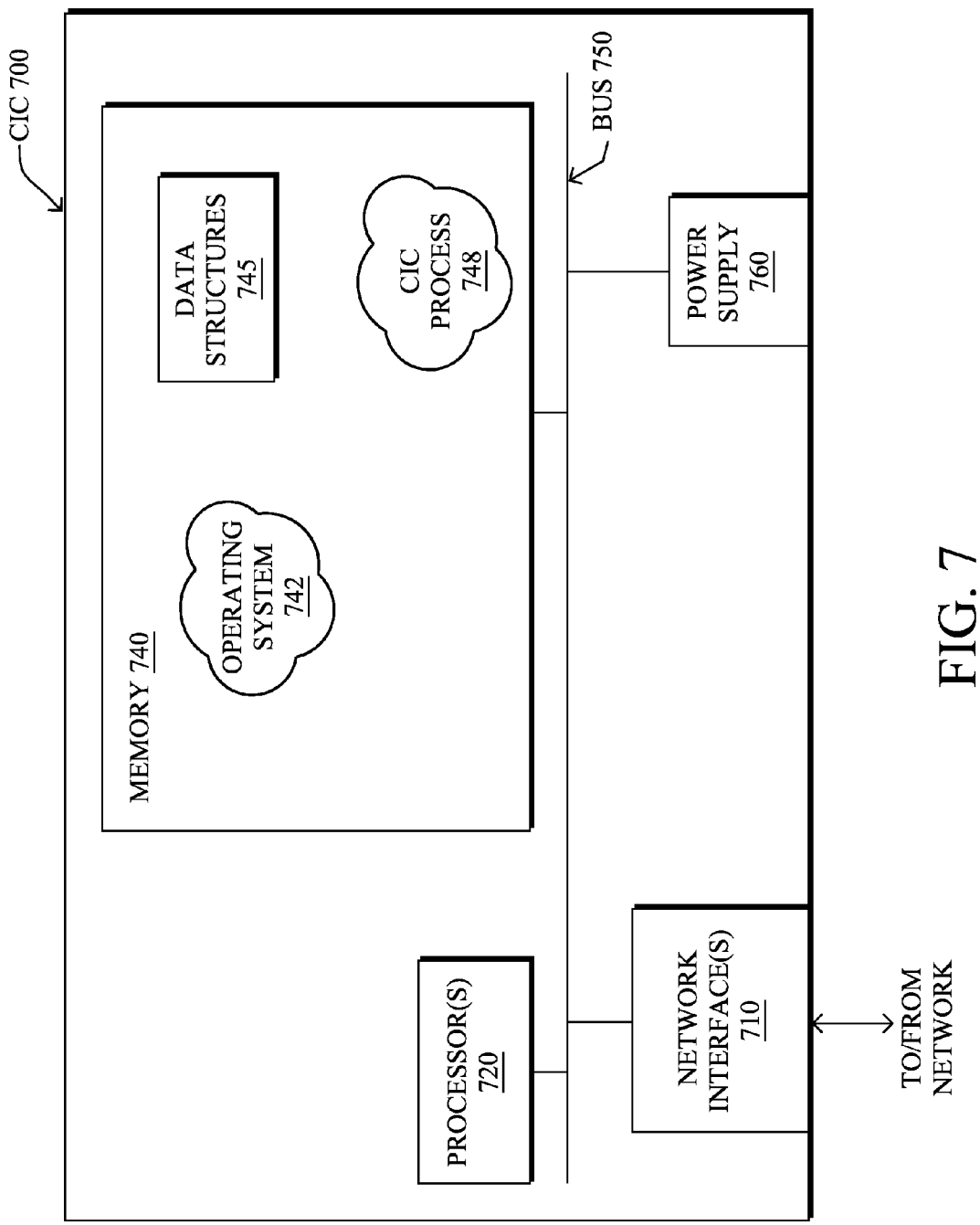
FIG. 7 illustrates an example of a central intelligence controller (CIA) device.

FIG. 7 is a schematic block diagram of an example device 700 that may be used with one or more embodiments described herein as a CIC. Similar to device 600, the CIC device 700 may comprise one or more network interfaces 710, at least one processor 720, and a memory 740 interconnected by a system bus 750, as well as a power supply 760 (e.g., plug-in). Within the memory 740 (which may store data structures 745), an operating system 742 functionally organizes the device by, inter alia, invoking operations in support of software processes and/or services executing on the device, such as a "CIC process" 748, as described herein.

In particular, as noted above, the CIC(s) 700 is(/are) configured to perform complex tasks for overarching control of MCO and DIA operation and also configured to provide one or more interfaces to receive a set of user-defined rules for the MCO and DIA operation. As such, CIC process 748 contains computer executable instructions executed by the processor 720 to perform functions related to such CIC actions, accordingly. As described herein, therefore, CIC process 748 is configured to perform complex tasks for overarching control of MCO and DIA operation performed by the CICs, such as security operations, performance monitoring, and SLA management, etc. In addition, as mentioned above, the CIC process 748 may also be configured for receiving instructions from the DIAs, and to correspondingly update MCO operation (e.g., via the DIAs or directly to the MCOs).

Such an architecture as described above specifies a strong paradigm shift from conventional computer architectures. For example, in contrast with current models, QoS is activated on each node regardless of traffic observation and SLAs, whereas in this model an external node (hosting the DIA) determines if/when/whether QoS must be activated based on traffic observation and SLAs provided by the CIC. In today's network, routing is either fully centralized (e.g., in most optical/SDH networks) or distributed. In the architecture as described herein, however, the role of the LBR (DIA 600) is to iteratively improve and/or build the routing topology if/when/where required. The NMS paradigm is also changed: instead of a peer-to-peer model between an NMS and device, intermediate intelligence is added into the network, thus performing a number of NMS tasks at the DIAs, accordingly.

Figure 8:
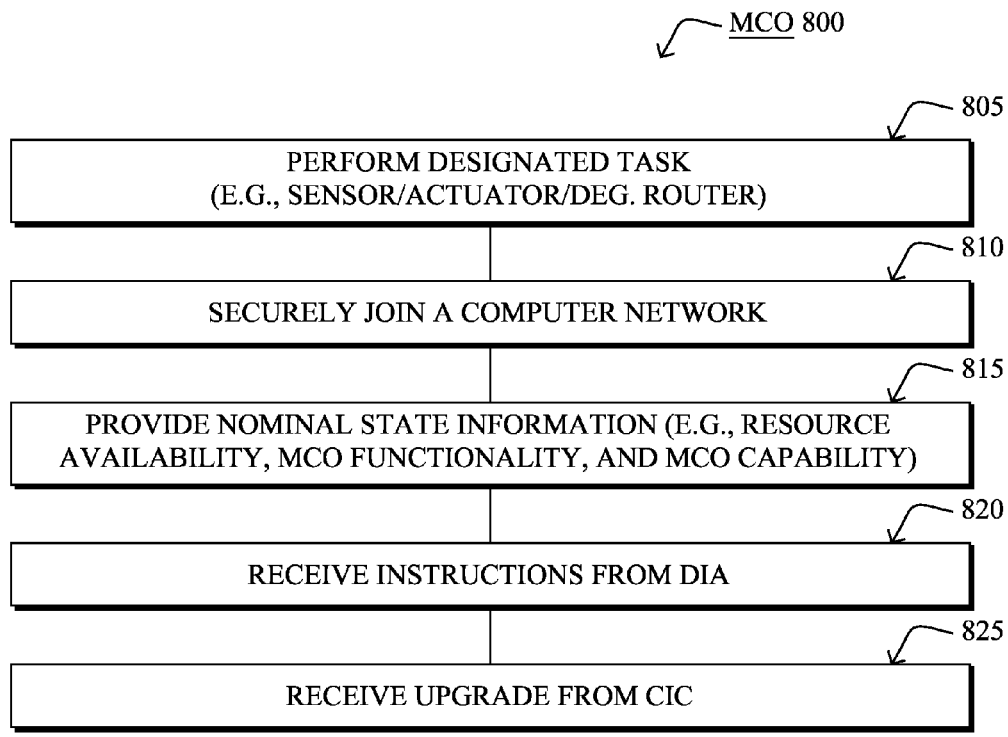
FIG. 8 illustrates an example simplified procedure for operating an MCO in the network architecture.

FIG. 8 illustrates an example simplified procedure 800 for operating an MCO 500 in accordance with one or more embodiments described herein. Notably, though an order of steps is shown, it should be understood that the procedure described is more of a listing of functionality, and no order need be inferred. As such, there is no "start" or "end" to the described procedure. As described in greater detail above, in function 805 the MCO 500 is configured to perform its designated task, for example, operating as a sensor, actuator, degenerated router, etc. In addition, in function 810, the MCO is configured to securely join a computer network as mentioned above, and in function 815 to also provide nominal state information. For instance, as noted herein, such nominal state information may comprise resource availability, MCO functionality, and MCO capability. Further, in function 820, the MCO is configured to receive instructions from a DIA 600, or else in function 825 to receive an upgrade or any other information and/or instruction from a CIC 700, accordingly.

Note that the function set of procedure 800 is kept simple, such that MCOs can, in fact, be minimalistic. In particular, as described herein, MCOs are not configured to perform complex application-specific data processing, make QoS decisions, participate in CAC operations, provide TE services, execute sophisticated reliability protocols, or extrapolate network management information, etc. Rather, much of this "more intelligent" functionality is pushed upward to the DIAs 600.

Figure 9:
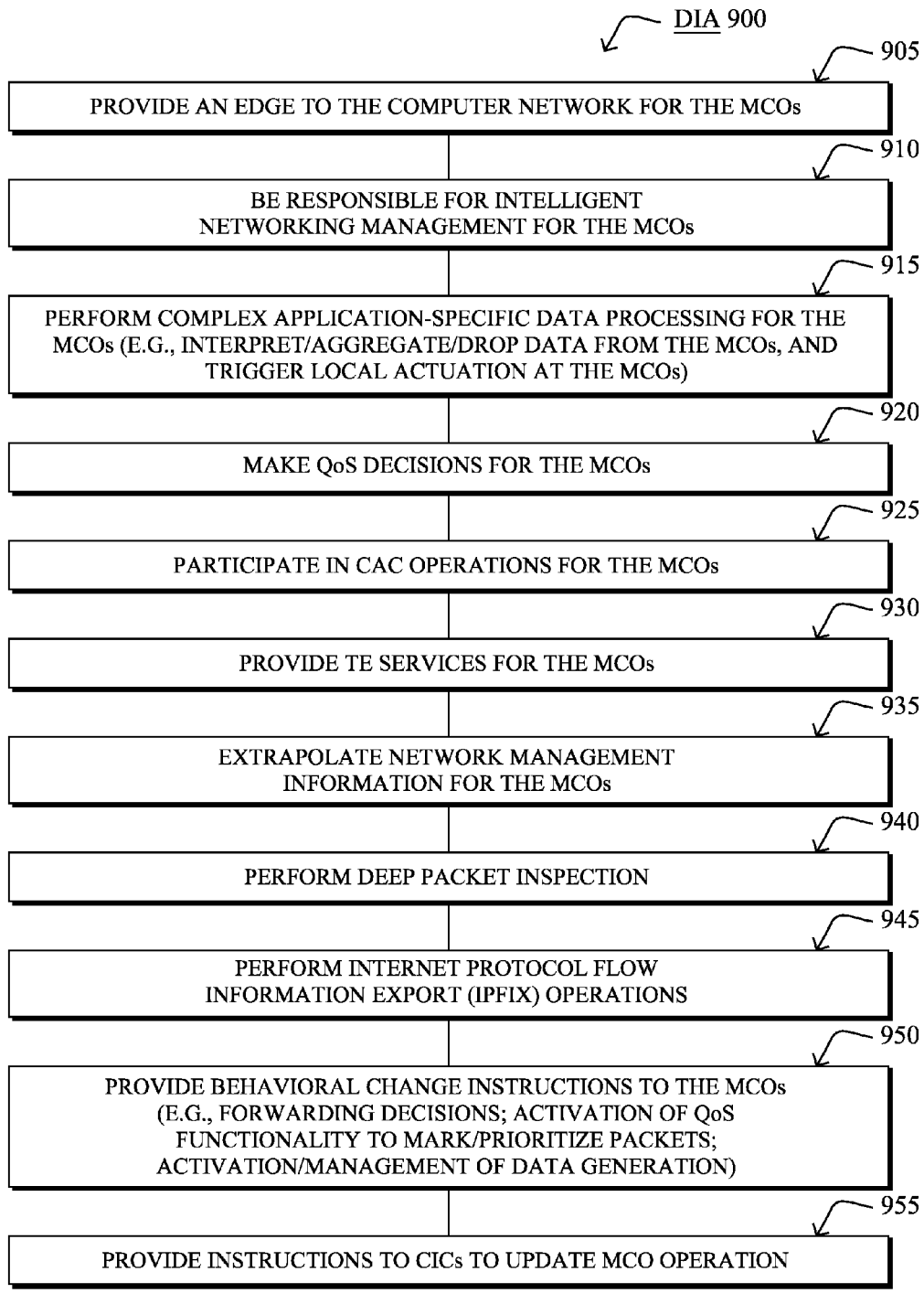
FIG. 9 illustrates an example simplified procedure for operating a DIA in the network architecture.

FIG. 9 illustrates an example simplified procedure 900 for operating a DIA 600 in accordance with one or more embodiments described herein. Note again, that though an order of steps is shown, it should be understood that the procedure described is more of a listing of functionality, and no order need be inferred. As such, there is no "start" or "end" to the described procedure. As described in greater detail above, in function 905 the DIAs 600 are generally configured to provide an edge to the computer network for the MCOs 500, while in function 910 the DIAs are also generally configured to be responsible for intelligent networking management for the MCOs. In addition, one or more of the DIAs, or else DIAs in general, are configured to perform complex networking and application-specific data processing for the MCOs in function 915 as described herein, e.g., interpreting, aggregating, or dropping data from the MCOs, as well as triggering local actuation at the MCOs, etc.

Moreover, in accordance with the architecture described herein, DIAs 600 may also be configured according to any one or more of the functionalities as follows, and as described in greater detail above:

function 920: make QoS decisions for the MCOs;
function 925: participate in CAC operations for the MCOs;
function 930: provide TE services for the MCOs;
function 935: extrapolate network management information for the MCOs;
function 940 perform deep packet inspection;
function 945: perform IPFIX operations;
function 950: provide behavioral change instructions to the MCOs, such as forwarding decisions; activation of QoS functionality to mark/prioritize packets; activation/management of data generation, etc.; and
function 955: provide instructions to CICs to update MCO operation and receive instructions from CIC(s).

Figure 10:
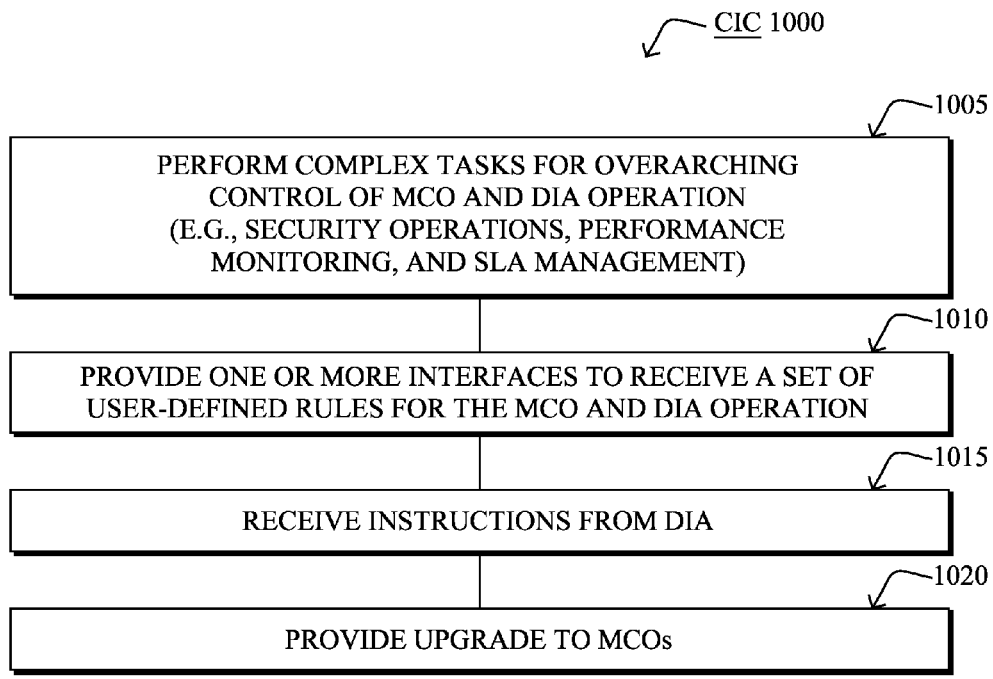
FIG. 10 illustrates an example simplified procedure for operating a CIC in the network architecture.

In addition, FIG. 10 illustrates an example simplified procedure 1000 for operating a CIC 700 in accordance with one or more embodiments described herein. Still, though an order of steps is shown, it should be understood that the procedure described is more of a listing of functionality, and no order need be inferred. As such, there is no "start" or "end" to the described procedure. As described in greater detail above, in function 1005 the CIC(s) is(/are) configured to perform complex tasks for overarching control of MCO and DIA operation. For instance, as mentioned above, such complex tasks may comprise various security operations, performance monitoring, and SLA management. Further, the CIC(s), in function 1010, is(/are) configured to provide one or more interfaces to receive a set of user-defined rules for the MCO and DIA operation. Also, the CIC(s) may be configured in function 1015 to receive instructions from a DIA, and also in function 1020 to provide update(s) to MCOs, accordingly.

It should be noted that certain functions (steps) within procedures 800-1000 may be optional, and those shown in FIGS. 8-10 are merely examples for illustration, and certain other functions may be included or excluded as desired. Further, as mentioned, while a particular order of the functions is shown, this ordering is merely illustrative, and any suitable arrangement of the functions may be utilized without departing from the scope of the embodiments herein. Moreover, while procedures 800-1000 are described separately, certain functions from each procedure may be incorporated into each other procedure, and the procedures are not meant to be mutually exclusive.

The novel techniques described herein, therefore, provide for a novel network architecture for minimalistic connected objects or MCOs. In particular, the techniques herein truly change the network paradigm and redistribute intelligence in the network, so as to run the network more efficiently, dramatically increase the understanding of the overall system, reduce complexity of constrained devices thus helping to activate many more devices in the network, and last but not least increase, by an order of magnitude, the scalability of very large-scale connected object networks, e.g., the Internet of Things.

While there have been shown and described illustrative embodiments that provide for a novel network architecture for MCOs, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks and/or protocols, regardless of whether they are low-powered or lossy. In addition, while the CICs are shown as being separate from the DIAs, in certain embodiments it is possible that the CIC functionality (CIC process 748) may reside locally on one or more DIAs, i.e., the CIC and DIA are a single device configured with both CIC and DIA functionality. Thus (or separately), the DIA may also have an interface to receive user-defined rules and configuration.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system, comprising:
   a plurality of minimalistic connected objects (MCOs), each MCO having just intelligence to perform its respective designated task, securely join a computer network, communicate with other MCOs of the plurality of MCOs and provide nominal state information, wherein the MCOs are not configured to perform complex application-specific data processing and complex networking tasks;
   one or more distributed intelligence agents (DIAs) configured to provide an edge to the computer network for the MCOs, the DIAs responsible for intelligent networking management for the MCOs, for performing complex application-specific data processing for the MCOs and for at least one of the following: making Quality of Service (QoS) decisions for the MCOs, participating in call admission control (CAC) operations, providing traffic engineering (TE) services, and extrapolating network management information for the MCOs; and
   one or more central intelligence controllers (CICs) within the computer network in communication with the DIAs, the CICs configured to perform complex tasks for overarching control of MCO and DIA operation and also configured to provide one or more interfaces to receive a set of user-defined rules for the MCO and DIA operation, wherein the complex tasks for overarching control of MCO and DIA operation performed by the CICs comprise at least one of security operations, performance monitoring, and service level agreement (SLA) management.

2. The system as in claim 1, wherein complex application-specific data processing by the DIAs comprises at least one of interpreting data from the MCOs, aggregating data from the MCOs, dropping data from the MCOs, and triggering local actuation at the MCOs.

3. The system as in claim 1, wherein the DIAs are configured to perform at least one of deep packet inspection and Internet Protocol flow information export (IPFIX) operations.

4. The system as in claim 1, wherein the DIAs are configured to provide behavioral change instructions to the MCOs.

5. The system as in claim 4, wherein behavioral changes are selected from a group consisting of: forwarding decisions; activation of quality of service (QoS) functionality to mark packets; activation of QoS functionality to apply priority to packets; configuration of call admission control (CAC); activation of data generation; and management of data generation.

6. The system as in claim 1, wherein the DIAs are configured to provide instructions to the one or more CICs to update MCO operation.

7. The system as in claim 1, wherein one or more of the CICs reside locally on one or more of the DIAs.

8. The system as in claim 1, wherein nominal state information provided by the MCOs comprises at least one of resource availability, MCO functionality, and MCO capability.

9. The system as in claim 1, wherein the designated task of each MCO is a sensor; an actuator; a tag; and a degenerated router; or a combination thereof.

10. An apparatus, comprising:
    a processor adapted to execute one or more processes;
    a memory configured to store a distributed intelligence agent (DIA) process executable by the processor;
    a plurality of minimalistic connected objects (MCOs), each MCO having just intelligence required to perform its respective designated task, securely join a computer network, communicate with other MCOs of the plurality of MCOs and provide nominal state information, wherein the MCOs are not configured to perform complex application-specific data processing and complex networking tasks, wherein the complex networking tasks are selected from making quality of service (QoS) decisions, participating in call admission control (CAC) operations, providing traffic engineering (TE) services, executing sophisticated reliability protocols, and extrapolating network management information;
    one or more network interfaces to communicate with one or more central intelligence controllers (CICs) within the computer network, the CICs configured to perform complex tasks for overarching control of MCO and DIA operation and also configured to provide one or more interfaces to receive a set of user-defined rules for the MCO and DIA operation, wherein the complex tasks for overarching control of MCO and DIA operation performed by the CICs comprise at least one of security operations, performance monitoring, and service level agreement (SLA) management; and
    wherein the DIA process when executed is operable to:
    provide an edge to the computer network for the MCOs;
    provide intelligent networking management for the MCOs; and perform complex application-specific data processing for the MCOs.

11. The apparatus as in claim 10, wherein complex application-specific data processing comprises at least one of interpreting data from the MCOs, aggregating data from the MCOs, dropping data from the MCOs, and triggering local actuation at the MCOs.

12. The apparatus as in claim 10, wherein the DIA process when executed is further operable to perform at least one of deep packet inspection and Internet Protocol flow information export (IPFIX) operations.

13. The apparatus as in claim 10, wherein the DIA process when executed is further operable to: provide behavioral change instructions to the MCOs.

14. The apparatus as in claim 13, wherein behavioral changes are selected from a group consisting of: forwarding decisions; activation of quality of service (QoS) functionality to mark packets; activation of QoS functionality to apply priority to packets; management of call admission control (CAC); activation of data generation; and management of data generation.

15. The apparatus as in claim 10, wherein the DIA process when executed is further operable to: provide instructions to the one or more CICs to update MCO operation.

16. The apparatus as in claim 10, wherein the memory is configured to store a CIC process executable by the processor to perform CIC operations.

17. The apparatus as in claim 10, wherein the designated task of each MCO is a sensor; an actuator; a tag; a degenerated router; or a combination thereof.

18. An apparatus, comprising:
a processor adapted to execute one or more processes;
a memory configured to store a minimalistic connected object (MCO) process executable by the processor, the MCO process when executed operable to have just intelligence required to:
perform a designated MCO task;
securely join a computer network;
communicate with other MCOs; and
provide nominal state information,
wherein the MCO process is not operable to perform complex application-specific data processing and complex networking tasks, wherein the complex networking tasks are selected from making quality of service (QoS) decisions, participating in call admission control (CAC) operations, providing traffic engineering (TE) services, executing sophisticated reliability protocols, and extrapolating network management information;
one or more network interfaces to communicate with other MCOs; and
one or more network interfaces to communicate with one or more distributed intelligence agents (DIAs) configured to provide an edge to the computer network for MCOs, the DIAs responsible for intelligent networking management for MCOs, for performing complex application-specific data processing for MCOs and at least one of the following: making QoS decisions for the MCOs, participating in CAC operations for the MCOs, providing TE services for the MCOs, and extrapolating network management information for the MCOs, the DIAs further configured to communicate with one or more network interfaces to communicate with one or more central intelligence controllers (CICs) within the computer network, the CICs configured to perform complex tasks for overarching control of MCO and DIA operation and also configured to provide one or more interfaces to receive a set of user-defined rules for the MCO and DIA operation,
wherein the complex tasks for overarching control of MCO and DIA operation performed by the CICs comprise at least one of security operations, performance monitoring, and service level agreement (SLA) management.

19. The apparatus as in claim 18, wherein the MCO process when executed is further operable to: receive behavioral change instructions from the DIAs, wherein behavioral changes are selected from a group consisting of: forwarding decisions; activation of quality of service (QoS) functionality to mark packets; activation of QoS functionality to apply priority to packets; management of call admission control (CAC); activation of data generation; and management of data generation.

20. The apparatus as in claim 18, wherein the designated task is a sensor; an actuator; a tag; a degenerated router; or a combination thereof.

21. The apparatus as in claim 18, wherein nominal state information provided by the MCO process comprises at least one of resource availability, MCO functionality, and MCO capability.

* * * * *